United States Patent
Sergeev et al.

(10) Patent No.: US 10,313,877 B2
(45) Date of Patent: Jun. 4, 2019

(54) METHOD AND SYSTEM FOR FACILITATING PARTICIPATION OF AN INTERMEDIARY NETWORK DEVICE IN A SECURITY GATEWAY COMMUNICATION BETWEEN AT LEAST ONE BASE STATION AND A CORE NETWORK PORTION IN A CELLULAR COMMUNICATION NETWORK

(71) Applicant: ADVA Optical Networking SE, Meiningen (DE)

(72) Inventors: Andrew Sergeev, Kfar Saba (IL); Evgeny Zemlerub, Netanya (IL); Eyal Ben-Sa'adon, Karkur (IL)

(73) Assignee: ADVA Optical Networking SE, Meiningen (DE)

( * ) Notice: Subject to any disclaimer, the term of this patent is extended or adjusted under 35 U.S.C. 154(b) by 249 days.

(21) Appl. No.: 15/152,848

(22) Filed: May 12, 2016

(65) Prior Publication Data

US 2016/0337847 A1 Nov. 17, 2016

(30) Foreign Application Priority Data

May 13, 2015 (EP) .................................... 15167688

(51) Int. Cl.
*H04L 29/06* (2006.01)
*H04W 12/04* (2009.01)
(Continued)

(52) U.S. Cl.
CPC ........ *H04W 12/04* (2013.01); *G06F 9/45533* (2013.01); *H04L 63/029* (2013.01);
(Continued)

(58) Field of Classification Search
None
See application file for complete search history.

(56) References Cited

U.S. PATENT DOCUMENTS 8,984,610 B2 * 3/2015 Spiers ................. H04L 63/0218
726/9
9,246,876 B1 * 1/2016 Melam ................ H04L 12/4641
(Continued)

FOREIGN PATENT DOCUMENTS

WO 2014062678 A1 4/2014

OTHER PUBLICATIONS

Bronstein et. al., "Uniform Handling and Abstraction of NFV Hardware Accelerators" IEEE Network (2015): pp. 22-29.

*Primary Examiner* — Lynn D Feild
*Assistant Examiner* — Vadim Savenkov
(74) *Attorney, Agent, or Firm* — The Webb Law Firm

(57) ABSTRACT

A method for facilitating participation of an intermediary network device in a security gateway communication including: establishing a secure channel between the intermediary network device and a security gateway; transmitting a virtual machine instantiation command generated by software running in the security gateway to the intermediary network device; instantiating a virtual machine on the intermediary network device; when establishing a secure communication session between the at least one base station and the core network portion via the security gateway for the first time, establishing an Internet Key Exchange communication between the virtual machine and the security gateway and transmitting session keys from the security gateway to the virtual machine during the Internet Key Exchange communication; establishing an IPsec tunnel between the virtual machine and the security gateway.

20 Claims, 4 Drawing Sheets

(51) Int. Cl.
*H04W 76/12* (2018.01)
*H04W 12/02* (2009.01)
*G06F 9/455* (2018.01)
*H04W 12/06* (2009.01)

(52) U.S. Cl.
CPC ........ *H04L 63/0272* (2013.01); *H04L 63/164* (2013.01); *H04W 12/02* (2013.01); *H04W 76/12* (2018.02); *H04L 2209/80* (2013.01); *H04W 12/06* (2013.01)

(56) References Cited

U.S. PATENT DOCUMENTS

| | | | |
|---|---|---|---|
| 2010/0027552 A1* | 2/2010 | Hill | H04L 12/66 370/401 |
| 2011/0016309 A1 | 1/2011 | Motoyama et al. | |
| 2011/0231659 A1 | 9/2011 | Sinha | |
| 2012/0096269 A1* | 4/2012 | McAlister | H04L 63/061 713/171 |
| 2014/0177434 A1 | 6/2014 | Cartmell | |
| 2014/0351590 A1 | 11/2014 | Lien | |
| 2015/0365322 A1* | 12/2015 | Shatzkamer | H04L 45/74 370/392 |
| 2016/0099860 A1* | 4/2016 | Huang | H04L 45/70 370/389 |

\* cited by examiner

METHOD AND SYSTEM FOR FACILITATING PARTICIPATION OF AN INTERMEDIARY NETWORK DEVICE IN A SECURITY GATEWAY COMMUNICATION BETWEEN AT LEAST ONE BASE STATION AND A CORE NETWORK PORTION IN A CELLULAR COMMUNICATION NETWORK

CROSS-REFERENCE TO RELATED APPLICATION

This application claims priority to European Patent Application No. 15 167 688.9 filed May 13, 2015, the disclosure of which is hereby incorporated in its entirety by reference.

BACKGROUND OF THE INVENTION

Field of the Invention

The present invention relates to a security gateway connection in a cellular communication network and in particular to a method and a system for facilitating participation of an intermediary network device in a security gateway communication between at least one base station and a core network portion in a cellular communication network.

Description of Related Art

Common cellular communications networks provide convenient wireless communications services. These services include, for example, cellular telephone services, paging, Internet access, and data transfer services, among others.

Such a common cellular communication network includes a core element and a Radio Access Network (RAN). The core element comprises at least a connectivity gateway and a mobility management function. The Radio Access Network further comprises base stations and respective mobile stations, the client devices. Each of the client devices is typically connected to one of the base stations. This connection needs management of backhaul and core network connectivity, which is usually facilitated by the core element.

Therein, it is in many situations desirable to encrypt communications sent over the network. For example, various government regulations require the use of encryption, even on private networks. Thus, security is a dominant concern in cellular communication networks. Conventional configurations typically employ a hub-and-spoke security implementation whereby the base stations and/or the client devices establish a long-lived IP Security (IPSec) tunnel to the core network portion over which all communications including signaling, voice communications, and data communications are sent. A security gateway may be provided to authenticate users, encrypt communications, and perform other relevant conventional security features, for example by using respective keys.

Common cellular communication networks usually further include intermediary network devices, which perform various types of processing, for example applying various policies, on transmitted messages. Unfortunately, some of this processing may not be possible unless the transmitted messages are decrypted prior to being processed. However, if the intermediary network devices are unable to decrypt encrypted messages, the intermediary network devices may not be able to perform the desired processing. Absent the ability to process the encrypted messages, these intermediary network devices will only be able to apply very basic policies to encrypted messages, which may in turn negatively affect overall network performance or even prevent the effective communication of encrypted messages within the cellular communication method.

US 2011/0231659 A1 discloses a method for out-of-band session key exchange, wherein a source device that plans to participate in one or more encrypted communication sessions with a destination device sends a discovery message towards the destination device. An intermediary device that processes this discovery message requests a master key from the source device. The source verifies that the intermediary device is a trusted device and then sends the intermediary device the requested master key. Prior to transmitting encrypted messages to the destination device, the source device sends session key information, encrypted using the master key, to the intermediary device. The intermediary device uses this session key information to decrypt and process encrypted messages sent as part of the encrypted communication session between the source device and the destination device.

There are further intermediary network devices known, which can inject traffic in a cellular communication network, for example network devices which are designed to improve mobile user experience and optimize resource utilization by performing content caching in order to accelerate downloading of content such as video streams and high-resolution images from the Internet. However, these devices usually cannot be placed near the base stations when an IPsec tunnel is established between the base stations and the core network portion, since the intermediary network device does not see traffic inside the IPsec tunnel and does not possess the respective keys, and, therefore, cannot perform content caching.

Therefore, methods for facilitating participation of a such an intermediary network device in a security gateway communication between at least one base station and a core network portion in a cellular communication network are desirable.

SUMMARY OF THE INVENTION

The present invention provides a method for facilitating participation of an intermediary network device in a security gateway communication between at least one base station and a core network portion in a cellular communication network, wherein a secure channel is established between the intermediary network device and a security gateway connecting between the at least one base station and the core network portion, a virtual machine instantiation command generated by software running in the security gateway is transmitted to the intermediary network device over the secure channel and a virtual machine is instantiated on the intermediary network device responsive to the virtual machine instantiation command. Further, an Internet Key Exchange communication between the virtual machine and the security gateway is established when establishing a secure communication session between the at least one base station and the core network portion via the security gateway for the first time, and session keys are transmitted from the security gateway to the virtual machine during the Internet Key Exchange communication. Further, an IPsec tunnel is established between the virtual machine and the security gateway using the transmitted session keys for facilitating participation of the intermediary network device in the secure communication session.

Thus, the method is based on a virtual machine, which acts as a virtual security gateway, hosted on the intermediary network device, which is executed by the security gateway, in particular the security gateway software in order not to weaken the security gateway domain. Session keys are negotiated and transmitted to the virtual security gateway during an Internet Key Exchange communication between the virtual machine and the security gateway and a trusted channel is pre-established between the virtual security gateway when a secure communication session between the at least one base station and the core network portion via the security gateway is established for the first time and, therefore, prior to transmitting encrypted messages over the security gateway communication for the first time, in order to secure inter-network traffic traversing over an inherently insecure network. The virtual gateway can then facilitate participation of an intermediary network device in the communication session through the established trusted channel using the transmitted session keys. Thus, the intermediary network device, which can be for example a network device that performs content caching in order to accelerate downloading of content such as videostreams and high-resolution images from the Internet, a Precision Time Protocol (PTP) master or a low latency X2 protocol switch for switching between neighboring base stations, can inject traffic in the cellular communication network through the established trusted channel. Therefore, a method for facilitating participation of such an intermediary network device in a security gateway communication between at least one base station and a core network portion in a cellular communication network is provided. Further, all steps are instantiated by the security gateway and, therefore in a trusted way, a secure connection is established between the security gateway and the intermediary network device, which cannot be terminated by the intermediary network device itself.

The session keys can include authentication keys and encryption and decryption keys. In an IPsec communication, an authentication key can be used by the Authentication Header (AH), which allows for authentication of the sender of data, and an encryption and decryption key can be used by the Encapsulating Security Payload (ESP), which supports both authentication of the sender and encryption of data, thereby supporting the secure exchange of packets in a communication system at the network or IP layer. Thus, these keys can be used to support the secure exchange of packets through the established trusted IPsec tunnel and, therefore, for facilitating participation of the intermediary network device in the security gateway communication between the least one base station and the core network portion.

In one embodiment, the Internet Key Exchange communication can be established subsequent to the security gateway receiving a security association request from the at least one base station.

In a further embodiment, the Internet Key Exchange communication can also be established prior to the security gateway responding to the security association request from the at least one base station.

In order to allow IPSec packets to be properly encapsulated and decapsulated, it is necessary to associate security services and a key between the traffic being transmitted and the remote node which is the intended recipient of the traffic. The construct used for this purpose is a Security Association (SA). Thus, in each case it can be ensured that the relevant session keys are negotiated and transmitted to the virtual machine and, therefore, to the virtual security gateway, prior to establishing an IPsec communication between the at least one base station and the core network portion and transmitting encrypted messages over the security gateway communication for the first time and in particular prior to the first encrypted packet arriving at the intermediary network device, in order to facilitate that the encrypted packet can be decrypted and processed by the intermediary network device.

Encryption and/or decryption of data communicated through the IPsec tunnel can be handled by the virtual machine, using the transmitted session keys. Thus, the intermediary network device can act as an ingress node for data communicated through the IPsec tunnel, wherein the data is encrypted at the virtual gateway, and can also act as an egress node for data communicated through the IPsec tunnel, wherein the data is decrypted at the virtual machine, thereby facilitating that data from the intermediary network device and data received at the intermediary network device can be respectively encrypted or decrypted and therefore communicated over the security gateway communication.

Further, the virtual machine can transmit the session keys to the intermediary network device before the session keys are negotiated between the at least one base station and the core network portion. The intermediary network device can handle encryption and/or decryption of data communicated through the IPsec tunnel using the session keys. This has the advantage that latency can be reduced compared to the data being encrypted or decrypted at the virtual machine, since the data can be encrypted or decrypted by the intermediary network device itself.

Further, an IPsec sequence number is regenerated by the intermediary network device every time data is communicated form the intermediary network device through the IPsec tunnel. IPsec usually implements a single range or set of monotonically increasing sequence numbers to track end-to-end delivery of IPSec packets sent from a source to a destination. Additionally, IPSec implements the sequence numbers to provide a security feature called anti-replay protection. Thus, the sequence number can be used to track and identify traffic injected into the security gateway communication by the intermediary network device.

A system for facilitating participation of an intermediary network device in a security gateway communication between at least one base station and a core network portion in a cellular communication network is also provided, wherein the system comprises a means for establishing a secure channel between the intermediary network device and a security gateway connecting between the at least one base station and the core network portion, a means for transmitting a virtual machine instantiation command generated by software running in the security gateway to the intermediary network device, a means for instantiating a virtual machine on the intermediary network device responsive to the virtual machine instantiation command, a means for establishing an Internet Key Exchange communication between the virtual machine and the security gateway when a secure communication session is established between the at least one base station and the core network portion via the security gateway for the first time, a means for transmitting session keys from the security gateway to the virtual machine during the Internet Key Exchange communication, and a means for establishing an IPsec tunnel between the virtual machine and the security gateway using the transmitted session keys for facilitating participation of the intermediary network device in the secure communication session.

The system is based on a virtual machine, which acts as a virtual security gateway, hosted on the intermediary network device, which is executed by the security gateway, in particular the security gateway software in order not to weaken the security gateway domain. Session keys are negotiated and transmitted to the virtual security gateway by the means for transmitting session keys from the security gateway to the virtual machine during the Internet Key Exchange communication, and a trusted channel is pre-established between the virtual security gateway by the means for establishing an IPsec tunnel between the virtual machine and the security gateway using the transmitted session keys when a secure communication session between the at least one base station and the core network portion via the security gateway is established for the first time and, therefore, prior to transmitting encrypted messages over the security gateway communication for the first time, in order to secure inter-network traffic traversing over an inherently insecure network. The virtual gateway can then facilitate participation of an intermediary network device in the communication session through the established trusted channel using the transmitted session keys. Thus, the intermediary network device, which can be for example a network device that performs content caching in order to accelerate downloading of content such as videostreams and high-resolution images from the Internet, a Precision Time Protocol (PTP) master or a low latency X2 protocol switch for switching between neighboring base stations, can inject traffic in the cellular communication network through the established trusted channel. Therefore, a system for facilitating participation of such an intermediary network device in a security gateway communication between at least one base station and a core network portion in a cellular communication network is provided. Further, all steps are instantiated by the security gateway and, therefore in a trusted way, a secure connection is established between the security gateway and the intermediary network device, which cannot be terminated by the intermediary network device itself.

The session keys can include authentication keys and encryption and decryption keys. In an IPsec communication, an authentication key can be used by the Authentication Header (AH), which allows for authentication of the sender of data, and an encryption and decryption key can be used by the Encapsulating Security Payload (ESP), which supports both authentication of the sender and encryption of data, thereby supporting the secure exchange of packets in a communication system at the network or IP layer. Thus, these keys can be used to support the secure exchange of packets through the established trusted IPsec tunnel and, therefore, for facilitating participation of the intermediary network device in the security gateway communication between the least one base station and the core network portion.

In one embodiment, the means for establishing an Internet Key Exchange communication between the virtual machine and the security gateway can establish the Internet Key Exchange Communication subsequent to the security gateway receiving a security association request from the at least one base station.

In a further embodiment, the means for establishing an Internet Key Exchange communication between the virtual machine and the security gateway can establish the Internet Key Exchange Communication prior to the security gateway responding to the security association request from the at least one base station.

In order to allow IPSec packets to be properly encapsulated and decapsulated, it is necessary to associate security services and a key between the traffic being transmitted and the remote node which is the intended recipient of the traffic. The construct used for this purpose is a Security Association (SA). Thus, in each case it can be ensured that the relevant session keys are negotiated and transmitted to the virtual machine and, therefore, to the virtual security gateway during an Internet Key Exchange communication is established between the virtual machine and the security gateway by the means for establishing an Internet Key Exchange communication and thus prior to establishing an IPsec communication between the at least one base station and the core network portion and transmitting encrypted messages over the security gateway communication for the first time and in particular prior to the first encrypted packet arriving at the intermediary network device, in order to facilitate that the encrypted packet can be decrypted and processed by the intermediary network device.

The system can further comprise a means for starting an application on the virtual machine which performs encryption and/or decryption of data communicated through the IPsec tunnel using the transmitted session keys. Thus, the intermediary network device can act as an ingress node for data communicated through the IPsec tunnel, wherein the data is encrypted at the virtual gateway, and can also act as an egress node for data communicated through the IPsec tunnel, wherein the data is decrypted at the virtual machine, thereby facilitating that data from the intermediary network device and data received at the intermediary network device can be respectively encrypted or decrypted and, therefore, communicated over the security gateway communication.

Also the session keys can be transmitted from the virtual machine to the intermediary network device before the session keys are negotiated between the at least one base station and the core network portion. The intermediary network device can comprise a means for handling encryption and/or decryption of data communicated through the IPsec tunnel using the encryption keys. This has the advantage that latency can be reduced compared to the data being encrypted or decrypted at the virtual machine, since the data can be encrypted or decrypted by the intermediary network device itself by the means for handling encryption and/or decryption of data communicated through the IPsec tunnel.

Furthermore, the intermediary network device can comprise a means for regenerating an IPsec sequence number every time data is communicated from the intermediary network device through the IPsec tunnel. IPsec usually implements a single range or set of monotonically increasing sequence numbers to track end-to-end delivery of IPSec packets sent from a source to a destination. Additionally, IPsec implements the sequence numbers to provide a security feature called anti-replay protection. Thus, the sequence number generated by the means for regenerating an IPsec sequence number every time data is communicated from the intermediary network device through the IPsec tunnel can be used to track and identify traffic injected into the security gateway communication by the intermediary network device.

BRIEF DESCRIPTION OF THE DRAWINGS

Embodiments of the invention will now be described with reference to the drawings.

DETAILED DESCRIPTION OF THE INVENTION

Figure 1:
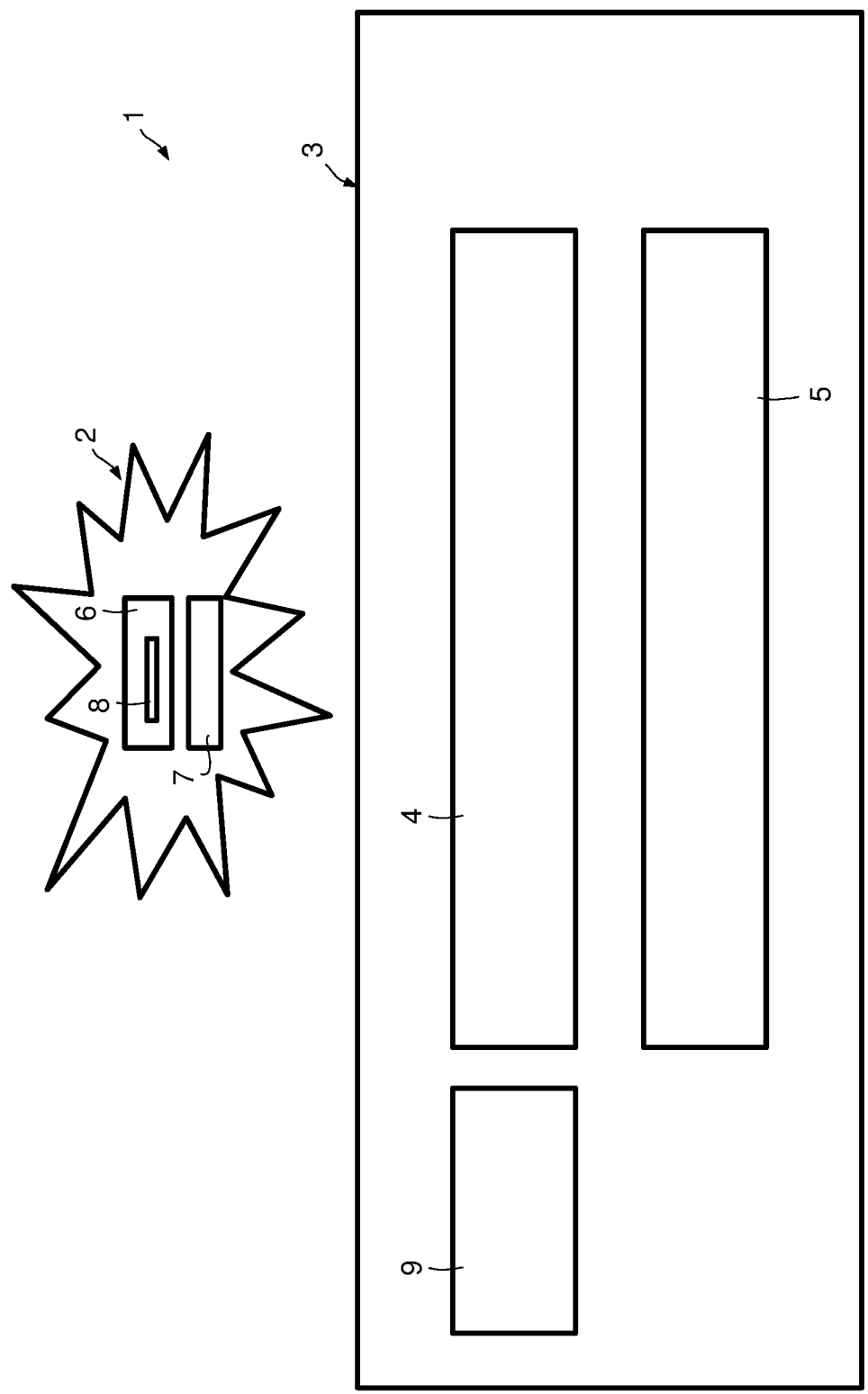
FIG. 1 illustrates a cellular communication network.

FIG. 1 illustrates a cellular communication network 1. As shown in FIG. 1, the cellular communication network comprises a core element 2 and a Radio Access Network (RAN) 3. According to FIG. 1, the Radio Access Network 3 further comprises base stations 4 and respective mobile stations, the client devices 5. Each of the client devices 5 is typically connected to one of the base stations 4. This connection needs management of backhaul and core network connectivity, which is usually facilitated by the core element 2. As shown in FIG. 1, the core element 2 includes at least a connectivity gateway functionality 6 and a mobility management functionality 7.

It is in many situations desirable to encrypt communications sent over the cellular communication network. 1 Conventional configurations typically employ a hub-and-spoke security implementation whereby the base stations 4 establish a long-lived IP Security (IPSec) tunnel to the core network portion 2 and thus to the client devices 5 over which all communications including signaling, voice communications, and data communications are sent. According to the cellular communication network 1 shown in FIG. 1, the connectivity gateway functionality 6 further comprises a security gateway 8, which is provided to encrypt communications, and perform other relevant conventional security features.

FIG. 1 further shows an intermediary network device 9, which is arranged in close proximity to one of the base stations 4, which can inject traffic in the cellular communication network 1. For example, the intermediary network device 9 can be a network device which is designed to improve mobile user experience and optimize resource utilization by performing content caching in order to accelerate downloading of content such as video streams and high-resolution images from the Internet. However, these devices usually cannot be placed near the base stations 4 when an IPsec tunnel is established between the base stations 4 and the core network portion 2, since the intermediary network device does not see traffic inside the IPsec tunnel and, therefore, cannot perform content caching.

Figure 2:
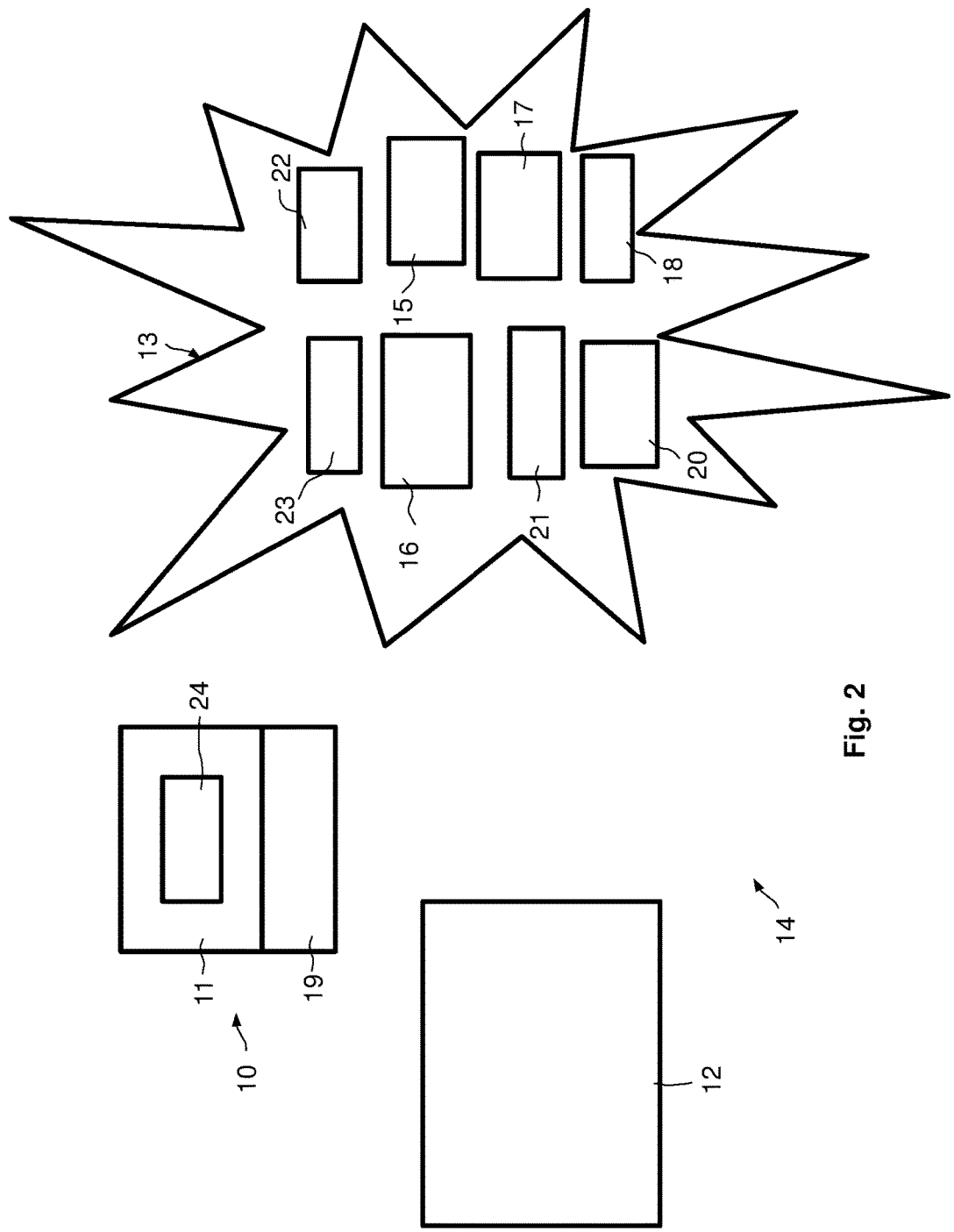
FIG. 2 illustrates a system for facilitating participation of an intermediary network device in a security gateway communication between at least one base station and a core network portion in a cellular communication network according to a first embodiment of the present invention.

FIG. 2 illustrates a system 10 for facilitating participation of an intermediary network device 11 in a security gateway communication between at least one base station 12 and a core network portion 13 in a cellular communication network 14 according to a first embodiment of the present invention.

The system 10 shown in FIG. 2 comprises a means 15 for establishing a secure channel between the intermediary network device 11 and a security gateway 16 connecting between the at least one base station 12 and the core network portion 13, a means 17 for transmitting a virtual machine instantiation command generated by software running in the security gateway 16 to the intermediary network device 11 over the secure channel, a means 18 for instantiating a virtual machine 19 on the intermediary network device 11 responsive to the virtual machine instantiation command, a means 20 for establishing an Internet Key Exchange communication between the virtual machine 19 and the security gateway 16 when a secure communication session is established between the at least one base station 12 and the core network portion 13 via the security gateway 16 for the first time, a means 21 for transmitting session keys from the security gateway 16 to the virtual machine 19 during the Internet Key Exchange communication, and a means 22 for establishing an IPsec tunnel between the virtual machine 19 and the security gateway 16 using the transmitted session keys for facilitating participation of the intermediary network device 11 in the security gateway communication between the at least one base station 12 and the core network portion 13.

The system 10 according to the embodiment of FIG. 2 is based on a virtual machine 19, which acts as a virtual security gateway, hosted on the intermediary network device 11 and executed by the security gateway 16, in particular the security gateway software in order not to weaken the security gateway domain. Session keys are negotiated and transmitted to the virtual security gateway by the means 21 for transmitting session keys from the security gateway 16 to the virtual machine 19 during the Internet Key Exchange communication, and a trusted channel is established between the virtual security gateway by the means 22 for establishing an IPsec tunnel between the virtual machine 19 and the security gateway 16 using the transmitted session keys when a secure communication session between the at least one base station 12 and the core network portion 13 via the security gateway 16 is established for the first time in order to secure inter-network traffic traversing over an inherently insecure network.

To perform the IPsec communication through the IPsec tunnel, it is necessary to establish a Security Association between the security gateway 16 and the virtual machine 19 that is a two-way logical connection between these two sides. For that reason, the IKE communication has two phases. Phase 1 is to establish IKE-SA for performing the IKE communication with safety. With the connection established successfully, phase 2 will be active, for exchanging security information including the session keys for facilitating the IPsec communication. Herein, the intermediary network device 11 can intercept the IKE communication and steer it towards the virtual machine 19.

The session keys include authentication and encryption and decryption keys. In an IPsec communication, an authentication key can be used by the Authentication Header (AH), which allows for authentication of the sender of data, and an encryption and decryption key can be used by the Encapsulating Security Payload (ESP), which supports both authentication of the sender and encryption of data, thereby supporting the secure exchange of packets in a communication system at the network or IP layer.

According to the embodiment of FIG. 2, the means 20 for establishing an Internet Key Exchange communication between the virtual machine 19 and the security gateway 16 establishes the Internet Key Exchange Communication subsequent to the security gateway 16 receiving a security association request from the at least one base station 12. In order to allow IPSec packets to be properly encapsulated and decapsulated, it is necessary to associate security services and a key between the traffic being transmitted and the remote node which is the intended recipient of the traffic. The construct used for this purpose is Security Association (SA), which denotes a construct to associate security services and a key between the traffic being transmitted and the remote node in order to allow IPSec packets to be properly encapsulated and decapsulated. Thus, it can be ensured that the relevant session keys are negotiated to the virtual machine and, therefore, to the virtual security gateway, prior to establishing an IPsec communication between the at least one base station and the core network portion and transmitting encrypted messages over the security gateway communication for the first time. Further, the means for establishing an Internet Key Exchange communication between the virtual machine and the security gateway can establish the Internet Key Exchange Communication prior to the security gateway responding to the security association request from the at least one base station, too, in order to ensure that the session keys are negotiated prior to establishing an IPsec communication between the at least one base station and the core network portion.

According to the embodiment of FIG. 2, the system 10 further comprises a means 23 for starting an application on the virtual machine 16 which performs encryption and/or decryption of data communicated through the IPsec tunnel using the transmitted session keys.

Further, the intermediary network device 11 comprises a means 24 for regenerating an IPsec sequence number every time data is communicated from the intermediary network device 11 through the IPsec tunnel. IPsec usually implements a single range or set of monotonically increasing sequence numbers to track end-to-end delivery of IPSEC packets sent from a source to a destination. Additionally, IPSEC implements the sequence numbers to provide a security feature called "anti-replay" protection.

Figure 3:
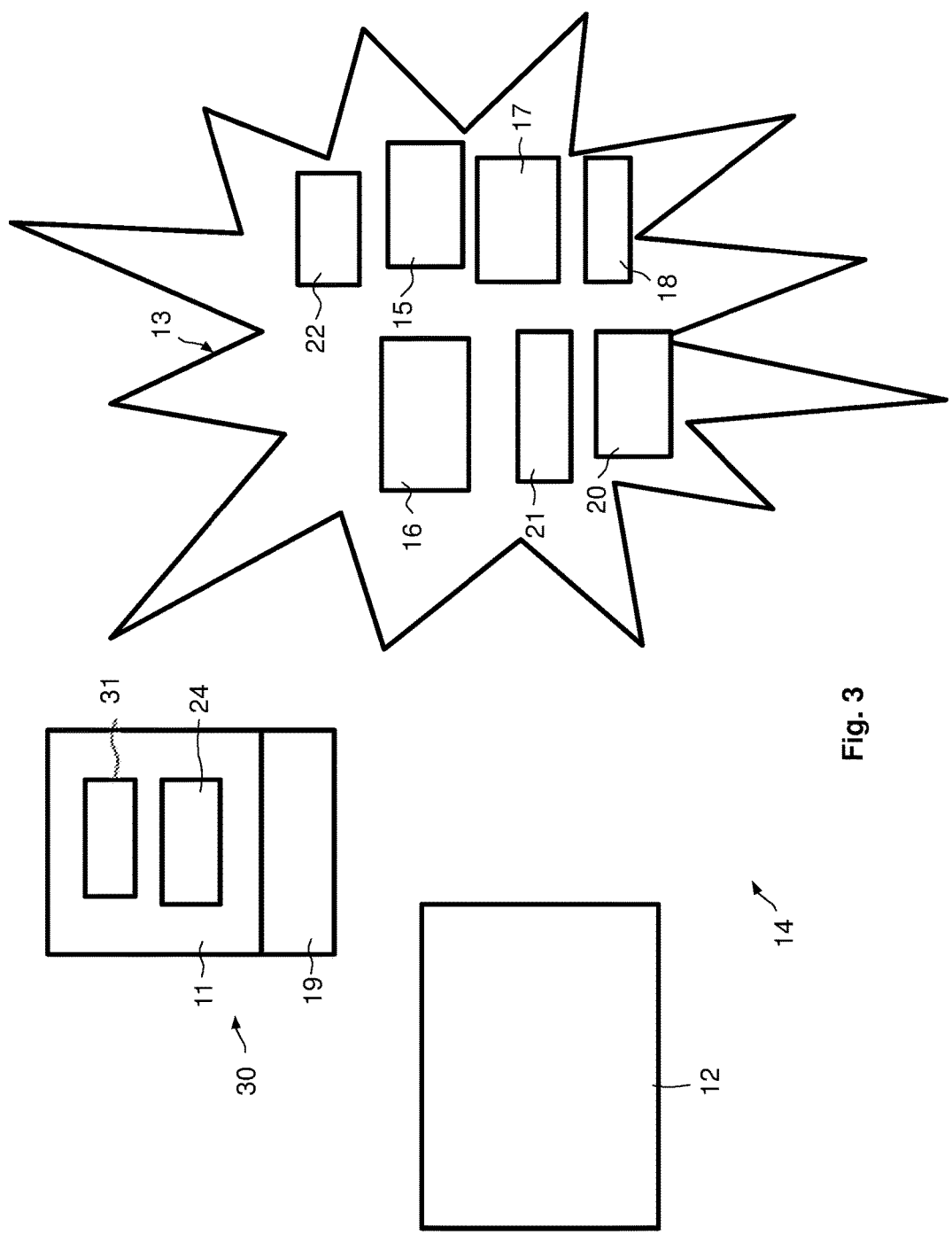
FIG. 3 illustrates a system for facilitating participation of an intermediary network device in a security gateway communication between at least one base station and a core network portion in a cellular communication network according to a second embodiment of the present invention.

FIG. 3 illustrates a system 30 for facilitating participation of an intermediary network device 11 in a security gateway communication between at least one base station 12 and a core network portion 13 in a cellular communication network 14 according to a second embodiment of the present invention. Therein, identical structural features as within the embodiment shown in FIG. 1 are identified by identical reference symbols.

According to FIG. 3, the difference between the system 30 of the second embodiment shown and the system 10 of the first embodiment is that the session keys are transmitted from the virtual machine 19 to the intermediary network device 11 before the session keys are negotiated between the at least one base station and the core network portion by an application running on the virtual machine 19 which can, for example, use a respective key known to the virtual machine 19. Further, the intermediary network device 11 comprises a means 31 for handling encryption and/or decryption of data communicated through the IPsec tunnel using the encryption keys. Such a system has the advantage that latency can be reduced compared to the data being encrypted or decrypted at the virtual machine 19, since the data can be encrypted or decrypted by the intermediary network device 11 itself by the means 31 for handling encryption and/or decryption of data communicated through the IPsec tunnel.

Figure 4:
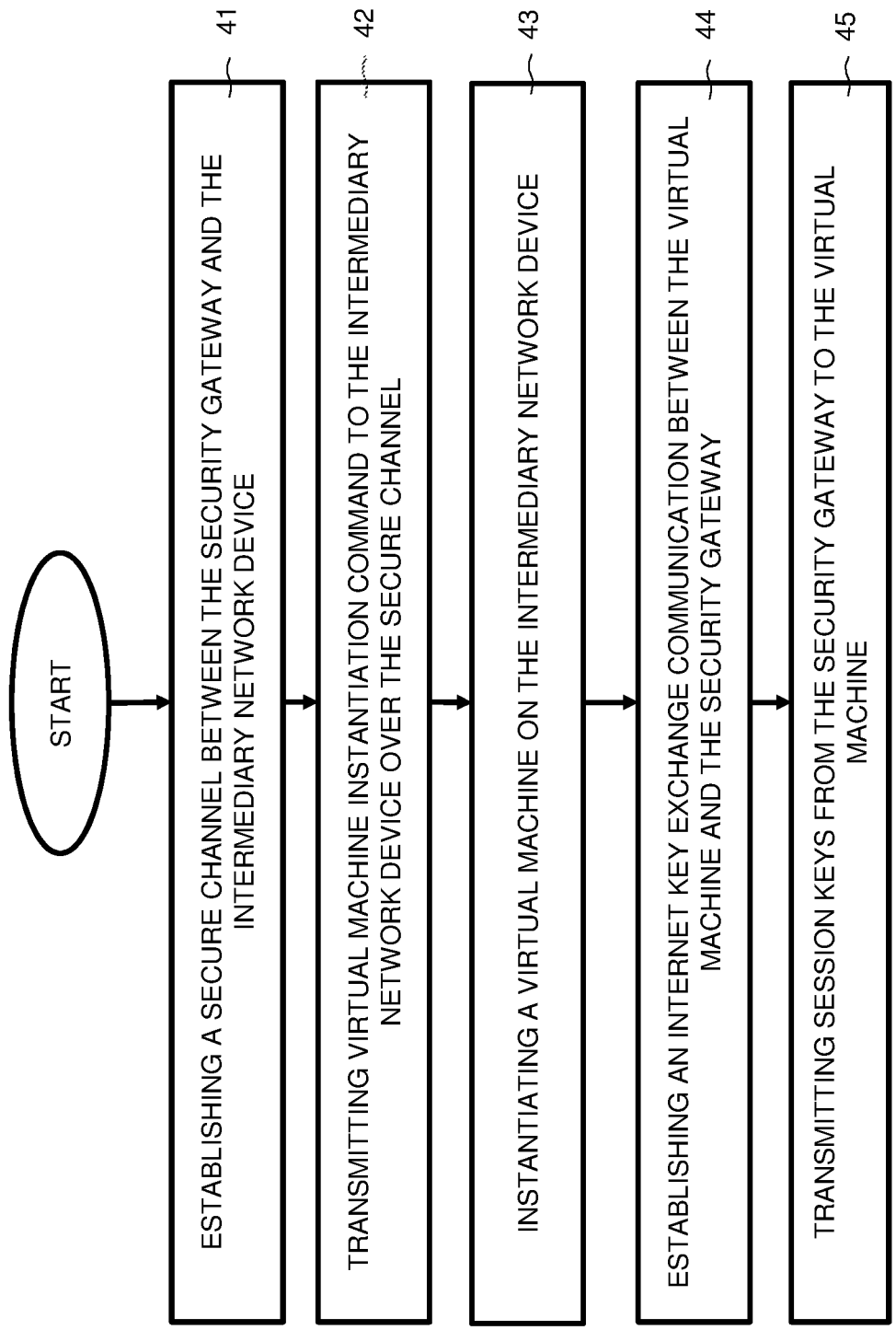
FIG. 4 illustrates a flowchart of a method for facilitating participation of an intermediary network device in a security gateway communication between at least one base station and a core network portion in a cellular communication network according to embodiments of the present invention.

FIG. 4 illustrates a flowchart of a method 40 for facilitating participation of an intermediary network device in a security gateway communication between at least one base station and a core network portion in a cellular communication network according to embodiments of the present invention.

As shown in FIG. 1, the method begins with the step 41 of establishing a secure channel between the intermediary network device and a security gateway connecting between the at least one base station and the core network portion.

At step 42 a virtual machine instantiation command generated by software running in the security gateway is transmitted to the intermediary network device over the secure channel.

At step 43 a virtual machine is instantiated on the intermediary network device responsive to the virtual machine instantiation command.

Then, at step 44, an Internet Key Exchange communication is established between the virtual machine and the security gateway when a secure communication session between the at least one base station and the core network portion via the security gateway is established for the first time, and session keys are transmitted from the security gateway to the virtual machine during the Internet Key Exchange communication;

At step 45, an IPsec tunnel is established between the virtual machine and the security gateway using the transmitted session keys for facilitating participation of the network interface device in the secure communication session.

LIST OF REFERENCE SIGNS 1 cellular communication network
2 core element
3 radio access network (RAN)
4 base element
5 client device
6 connectivity gateway functionality
7 mobility management functionality
8 security gateway
9 intermediary network device
10 system for facilitating participation of an intermediary network device
11 intermediary network device
12 base station
13 core network portion
14 cellular communication network
15 means for establishing a secure channel
16 security gateway
17 means for transmitting a virtual machine instantiation command
18 means for instantiating a virtual machine
19 virtual machine
20 means for establishing an Internet Key Exchange communication
21 means for transmitting session keys
22 means for establishing an IPsec tunnel
23 means for starting an application on the virtual machine
24 means for regenerating an IPsec sequence number
30 system for facilitating participation of an intermediary network device
31 means for handling encryption and/or decryption of data communicated
40 method according to the invention
41 step of establishing a secure channel
42 step of transmitting a virtual machine instantiation command
43 step of instantiating a virtual machine
44 step of establishing an Internet Key Exchange communication
45 step for establishing an IPsec tunnel

The invention claimed is:
1. A method for facilitating participation of an intermediary network device in a security gateway communication between at least one base station and a core network portion in a cellular communication network, the method comprising the steps of:
(a) establishing a secure channel between the intermediary network device and a security gateway connecting between the at least one base station and the core network portion, and wherein a security gateway communication is established between the at least one base station and the core network portion via the security gateway, wherein the intermediary network device is arranged in close proximity to the at least one base station and is configured to inject traffic in the cellular communication network;
(b) transmitting a virtual machine instantiation command generated by software running in the security gateway to the intermediary network device over the secure channel;
(c) instantiating a virtual machine on the intermediary network device responsive to the virtual machine instantiation command;
(d) when establishing a secure communication session between the at least one base station and the core network portion via the security gateway for the first time, establishing an Internet Key Exchange communication between the virtual machine and the security gateway and transmitting session keys from the security gateway to the virtual machine during the Internet Key Exchange communication;
(e) establishing an IPsec tunnel between the virtual machine and the security gateway using the transmitted session keys for facilitating participation of the network interface device in the secure communication session.

2. The method according to claim 1, wherein the session keys include authentication keys and encryption and decryption keys.

3. The method according to claim 1, wherein the Internet Key Exchange communication is established subsequent to the security gateway receiving a security association request from the at least one base station.

4. The method according to claim 1, wherein the Internet Key Exchange communication is established prior to the security gateway responding to a security association request from the at least one base station.

5. The method according to claim 2, wherein the virtual machine handles encryption and/or decryption of data communicated through the IPsec tunnel using the transmitted session keys.

6. The method according to claim 2, wherein the virtual machine transmits the session keys to the intermediary network device prior to the session keys being negotiated between the at least one base station and the core network portion, and wherein the intermediary network device handles encryption and/or decryption of data communicated through the IPsec tunnel using the session keys.

7. The method according to claim 1, wherein an IPsec sequence number is regenerated by the intermediary network device every time data is communicated from the intermediary network device through the established IPsec tunnel.

8. A system for facilitating participation of an intermediary network device in a security gateway communication between at least one base station and a core network portion in a cellular communication network, comprising:
a secure channel established, by a security gateway, between the intermediary network device and the security gateway, wherein a security gateway communication is established between the at least one base station and the core network portion via the security gateway, and wherein the intermediary network device is arranged in close proximity to the at least one base station and is configured to inject traffic in the cellular communication network,
a virtual machine instantiation command generated by software running in the security gateway, and transmitted, by the security gateway, to the intermediary network device over the secure channel,
a virtual machine instantiated on the intermediary network device, by the intermediary device, responsive to the virtual machine instantiation command,
an Internet Key Exchange communication established, by the security gateway, between the virtual machine and the security gateway when a secure communication session is established between the at least one base station and the core network portion via the security gateway for the first time,
wherein the Internet Key Exchange communication includes session keys transmitted from the security gateway to the virtual machine during the Internet Key Exchange communication, and
an IPsec tunnel established between the virtual machine and the security gateway using the transmitted session keys for facilitating participation of the intermediary network device in the secure communication session.

9. The system according to claim 8, wherein the session keys include authentication keys and encryption and decryption keys.

10. The system according to claim 8, wherein the means for establishing an Internet Key Exchange communication between the virtual machine and the security gateway establishes the Internet Key Exchange Communication subsequent to the security gateway receiving a security association request from the at least one base station.

11. The system according to claim 8, wherein the means for establishing an Internet Key Exchange communication between the virtual machine and the security gateway establishes the Internet Key Exchange Communication prior to the security gateway responding to a security association request from the at least one base station.

12. The system according to claim 8, wherein the system further comprises a means for starting an application on the virtual machine which performs encryption and/or decryption of data communicated through the IPsec tunnel using the transmitted session keys.

13. The system according to claim 8, wherein the session keys are transmitted from the virtual machine to the intermediary network device prior to the session keys being negotiated between the at least one base station and the core network portion and wherein the intermediary network device comprises a means for handling encryption and/or decryption of data communicated through the IPsec tunnel using the session keys.

14. The system according to claim 8, wherein the intermediary network device comprises a means for regenerating an IPsec sequence number every time data is communicated from the intermediary network device through the IPsec tunnel.

15. The method according to claim 2, wherein the Internet Key Exchange communication is established subsequent to the security gateway receiving a security association request from the at least one base station.

16. The method according to claim 2, wherein the Internet Key Exchange communication is established prior to the security gateway responding to a security association request from the at least one base station.

17. The method according to claim 3, wherein the virtual machine handles encryption and/or decryption of data communicated through the IPsec tunnel using the transmitted session keys.

18. The system according to claim 9, wherein the means for establishing an Internet Key Exchange communication between the virtual machine and the security gateway establishes the Internet Key Exchange Communication subsequent to the security gateway receiving a security association request from the at least one base station.

19. The system according to claim 9, wherein the means for establishing an Internet Key Exchange communication between the virtual machine and the security gateway establishes the Internet Key Exchange Communication prior to the security gateway responding to a security association request from the at least one base station.

20. The system according to claim 9, wherein the system further comprises a means for starting an application on the virtual machine which performs encryption and/or decryption of data communicated through the IPsec tunnel using the transmitted session keys.

\* \* \* \* \*